US008841629B2

(12) United States Patent

Hendrickson et al.

(10) Patent No.: US 8,841,629 B2

(45) Date of Patent: Sep. 23, 2014

(54) MICROWAVE EXCURSION DETECTION FOR SEMICONDUCTOR PROCESSING

(75) Inventors: Scott A. Hendrickson, Brentwood, CA (US); Liliya Krivulina, Sunnyvale, CA (US); Juan Carlos Rocha, San Carlos, CA (US); Sanjeev Baluja, Campbell, CA (US)

(73) Assignee: Applied Materials, Inc., Santa Clara, CA (US)

( * ) Notice: Subject to any disclaimer, the term of this patent is extended or adjusted under 35 U.S.C. 154(b) by 164 days.

(21) Appl. No.: 13/534,575

(22) Filed: Jun. 27, 2012

(65) Prior Publication Data

US 2014/0000515 A1 Jan. 2, 2014

(51) Int. Cl.
*G01J 1/42* (2006.01)

(52) U.S. Cl.
USPC .......... 250/395

(58) Field of Classification Search
USPC .......... 250/395
See application file for complete search history.

(56) References Cited

U.S. PATENT DOCUMENTS

| | | | | |
|---|---|---|---|---|
| 5,583,523 | A * | 12/1996 | Wallace, Jr. | 343/741 |
| 6,566,278 | B1 | 5/2003 | Harvey et al. | |
| 6,614,181 | B1 | 9/2003 | Harvey et al. | |
| 6,832,077 | B1 * | 12/2004 | McKitterick | 455/73 |
| 7,777,198 | B2 | 8/2010 | Rocha-Alvarez et al. | |
| 2007/0193516 | A1 | 8/2007 | Yoshida et al. | |
| 2007/0286963 | A1 | 12/2007 | Rocha-Alvarez et al. | |
| 2008/0075640 | A1 | 3/2008 | Takeda et al. | |
| 2009/0001990 | A1 * | 1/2009 | Schmitkons et al. | 324/414 |
| 2010/0285240 | A1 | 11/2010 | Rocha-Alvarez et al. | |

FOREIGN PATENT DOCUMENTS

| | | | |
|---|---|---|---|
| JP | 2006156695 | A | 6/2006 |
| KP | 100271622 | B1 | 12/2000 |

OTHER PUBLICATIONS

PCT international search report and written opinion of PCT/US2013/039992 dated Sep. 17, 2013.

* cited by examiner

*Primary Examiner* — David Porta
*Assistant Examiner* — Hugh H Maupin
(74) *Attorney, Agent, or Firm* — Patterson & Sheridan, LLP

(57) ABSTRACT

Devices and methods are provided for monitoring low-level microwave excursions from a UV curing system to determine if equipment is damaged, such as screen tears or improper assembly of UV lampheads. A radio frequency (RF) detector may be used to detect microwaves in a range of about 0.2-5 mW/cm$^2$, wherein the RF detector comprises an antenna with a hoop shaped portion, a circuit board having a diode detector and an amplifier circuit, a housing, and a bracket coupled to the housing that is suitable for coupling the RF detector to the UV curing system. An alarm threshold may also be set, which can be correlated to microwave levels at or below levels that could cause damage to semiconductor devices being processed. A substrate processing system comprising an RF detector is also provided.

17 Claims, 7 Drawing Sheets

MICROWAVE EXCURSION DETECTION FOR SEMICONDUCTOR PROCESSING

BACKGROUND OF THE INVENTION

1. Field of the Invention

Aspects of the present invention generally relate to devices and methods for radio frequency detection in semiconductor processing. Further embodiments relate to devices and methods for detecting low level microwave excursions during UV curing of substrates and wafers.

2. Description of the Related Art

Silicon containing materials such as silicon oxide, silicon carbide and carbon doped silicon oxide films are frequently used in the fabrication of semiconductor devices. Silicon-containing films can be deposited on a semiconductor substrate through various deposition processes, such as chemical vapor deposition (CVD). For example, a semiconductor substrate may be positioned within a CVD chamber, and a silicon containing compound may be supplied along with an oxygen source to react and deposit a silicon oxide film on the substrate. In other examples, organosilicon sources may be used to deposit a Si—C bond. Film layers made by CVD processes may also be stacked to form composite films. In some processes, ultraviolet (UV) radiation can be used to cure, densify and/or relieve internal stresses of films or film layers created by the deposition process. Additionally, byproducts such as water, organic fragments or undesired bonds may be reduced or eliminated. The use of UV radiation for curing and densifying CVD films can also reduce the overall thermal budget of an individual wafer and speed up the fabrication process.

A number of various UV curing systems have been developed which can be used to effectively cure films deposited on substrates. U.S. Pat. Nos. 6,566,278, 6,614,181, 7,777,198 and 8,203,126 (assigned to Applied Materials, Inc.) describe using UV light to treat deposited films, and are incorporated by reference herein in their entirety.

UV light may be produced by microwave generators or radio frequency (RF) energy sources exciting gases within UV bulbs. Radiofrequency (RF) and microwave (MW) radiation may be considered electromagnetic radiation in the frequency ranges 3 kilohertz (kHz)-300 Megahertz (MHz), and 300 MHz-300 gigahertz (GHz), respectively. However, the terminology RF can also be used to refer to broader frequency ranges, which include microwaves. In the context of this patent, the term RF is used in its broadest sense to include microwaves.

In order to provide high intensity UV in the curing process, a high voltage power supply and a lamphead with an electrode-less bulb can be used. For example, a power supply can provide voltage to magnetrons embedded inside of a lamphead. The magnetrons generate the microwave that in turn ignites the gases in the bulb to generate the UV used for processing the wafers. A fine mesh screen is positioned on the lamphead that allows UV light to pass through on its way to the substrate, but that blocks microwaves. Screens may be made from stainless steel and clamped between two pieces of metal with RF gasketing to prevent microwave leakage. In case of an equipment failure, Microwave detection may be used to protect personnel from harmful doses of microwaves.

It has been discovered that low level leakage of microwaves that are safe for humans (for example 5 mW/cm$^2$ and below) may still cause wafer damage or non-uniformities and may have detrimental effects on the properties of films that are deposited on substrates such as wafers. Damaged wafers can have shifts in uniformity and stress. For example, a small tear in the fine mesh screen allows low-level microwave leakage that is safe for humans, but that causes shifts in device uniformity and film stress. These issues are not detected until after a production run is complete, because current UV processing equipment has no means of detecting low-level microwave excursions that damage semiconductor devices on the wafers. Therefore, a need exists for devices and methods to detect and/or prevent RF and microwave leakage at levels that may damage semiconductor devices.

SUMMARY OF THE INVENTION

Devices and methods are provided for detecting low level RF and/or microwave leakage for processes such as UV curing of semiconductor substrates. Further embodiments relate to detecting microwave leakage at levels that are potentially harmful to semiconductor devices. Additional embodiments relate to setting alarm limits, which may be used to alert process operators. In one embodiment, a substrate processing system is provided comprising: a chamber body; a substrate support positioned within the chamber body; an ultraviolet radiation lamphead assembly fixed to the chamber body and spaced apart from the substrate support, the lamphead assembly having an ultraviolet bulb positioned in a resonant cavity, one or more microwave generators, and a screen positioned between the ultraviolet bulb and the substrate support; and an RF detector comprising an antenna and a circuit having a diode detector and an amplifier, wherein the RF detector is positioned to monitor low-level microwave excursions in a range that prevents damage to a substrate.

In a further embodiment, the low-level microwave excursions comprise values between about 5 mW/cm$^2$ to about 0.2 mW/cm$^2$. In another embodiment, the ultraviolet radiation lamphead further comprises: a primary reflector assembly positioned to reflect ultraviolet radiation towards the substrate support; a secondary reflector assembly positioned in an area below the screen and above the substrate support; an upper housing having an interior space for housing the ultraviolet resonant cavity; and a lower housing having an interior space for housing the secondary reflector and an exterior surface, wherein the RF detector is coupled to an exterior surface of the lower housing.

In yet another embodiment, the substrate processing system further comprises a monitoring system coupled to the RF detector, wherein the monitoring system adapted to monitor an input parameter from the RF detector related to microwave detection and generates an alert signal if an alert-threshold is met or exceeded. In a further embodiment, the alert-threshold is set or adjusted to monitor peak measurements in real time as the ultraviolet radiation lamphead assembly rotates.

In another embodiment, the antenna is unshielded and has two leg portions coupled to a hoop-shaped portion, the RF detector further comprises a circuit board within an RF housing, and the two leg portions of the antenna are coupled to the circuit board within the RF housing. In a further embodiment, the RF housing has an antenna opening, and the two leg portions of the antenna extend a distance from the circuit board through the antenna opening to the hoop shaped portion of the antenna. In yet another embodiment, the substrate processing system further comprises a rotation disc having an external diameter, wherein the antenna of the RF detector is positioned a radial distance from the external diameter of the rotation disc, and the hoop-shaped portion of the antenna is in a vertical alignment. In a further embodiment, the RF housing comprises a bracket having a mounting adaptor suitable for coupling to the lower housing of the lamphead. In still another embodiment, the bracket has an extension section suitable for positioning the RF detector at a desired elevation.

In a different embodiment, a radio frequency (RF) detector is provided comprising: an antenna having a hoop-shaped portion; a circuit board having a diode detector, an amplifier circuit and a power supply, wherein the antenna is coupled to the circuit board; a circuit board housing having an interior space for housing the circuit board, wherein the hoop-shaped portion of the antenna is positioned outside the housing; and a bracket coupled to the housing and suitable for coupling the RF detector to a UV curing system, wherein the RF detector is adapted to monitor low-level microwave excursions in a range that prevents damage to a substrate.

In a further embodiment, the RF detector comprises a monitoring system having a threshold alert limit, wherein the RF detector outputs a voltage value, and the low-level microwave excursions comprise values between about 5 mW/cm$^2$ to about 0.2 mW/cm$^2$. In another embodiment, the circuit board housing further comprises a base plate coupled to the bracket, and the base plate and the bracket comprise a single piece of metal. In yet another embodiment, the hoop-shaped portion of the antenna is positioned vertically, and the bracket comprises a mounting piece positioned at an angle with respect to a bracket body. In still another embodiment, the bracket has an extension section coupled to the bracket body and suitable for positioning the RF detector at a desired elevation.

In another embodiment, a method is provided for detecting low-level microwave excursions in a UV curing system, the method comprising: exposing one or more ultraviolet (UV) bulbs to microwaves to generate UV radiation from a UV lamp assembly having one or more resonance chambers; monitoring a value related to microwaves excursions in a region external to the one or more resonance chambers; and generating an alarm when the monitored value meets or exceeds a threshold value. In some embodiments, the method may further comprise: placing a substrate on a substrate support in a substrate processing chamber; and exposing the substrate to the ultraviolet (UV) radiation.

In a further embodiment, the step of monitoring a value related to microwave excursions further comprises using a radio frequency (RF) detector comprising: an antenna having a hoop-shaped portion; a circuit board having a diode detector, an amplifier circuit and a power supply, wherein the antenna is coupled to the circuit board; a circuit board housing having an interior space for housing the circuit board, wherein the hoop-shaped portion of the antenna is positioned outside the housing; and a bracket coupled to the housing and suitable for coupling the RF detector to a UV curing system, wherein the RF detector is adapted to monitor low-level microwave excursions in a range that prevents damage to a substrate. In another embodiment, the method further comprises rotating the UV lamp assembly. In yet another embodiment, the threshold value is set or adjusted to be less than an amount at which the value correlates to microwave excursions that harm the substrate. In still another embodiment, the method further comprises checking for equipment damage.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted that the appended drawings illustrate only example embodiments for discussion, and are therefore not drawn to scale and are not limiting of claim scope.

It is contemplated that features of one embodiment may be beneficially incorporated in other embodiments without further recitation.

DETAILED DESCRIPTION

Embodiments discussed herein provide for devices and methods to detect low-level RF and/or microwave leakage for processes such as UV curing of semiconductor substrates. Further embodiments relate to detecting microwave excursions from UV lampheads at levels that are potentially harmful to semiconductor devices. Additional embodiments relate to setting alarm limits, which may be used to alert process operators to check for damaged equipment such as tears in screens or improper equipment assembly.

Figure 1A:
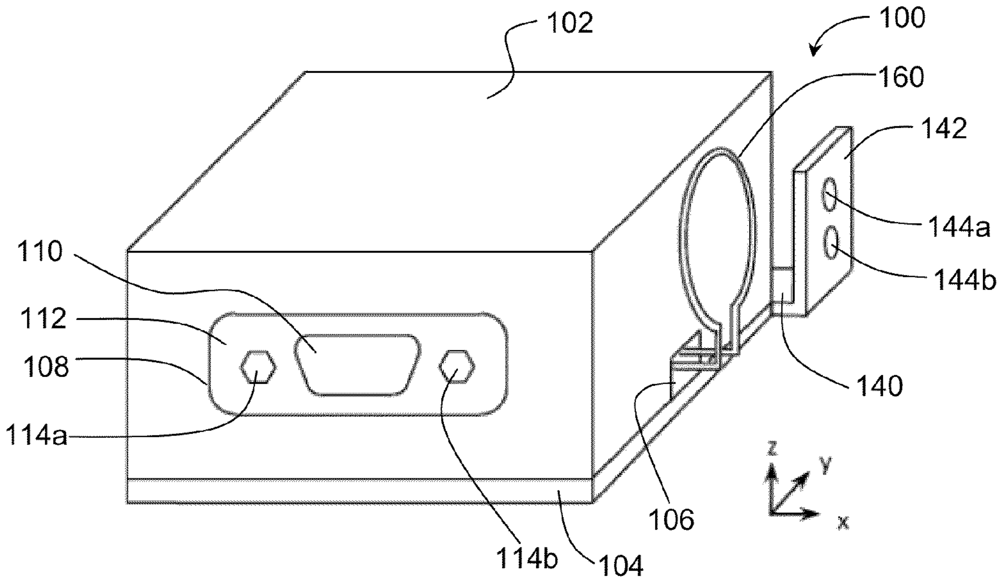
FIG. 1*a* illustrates a perspective view of an RF detector with an antenna for use in UV curing systems, according to some embodiments.
Figure 1B:
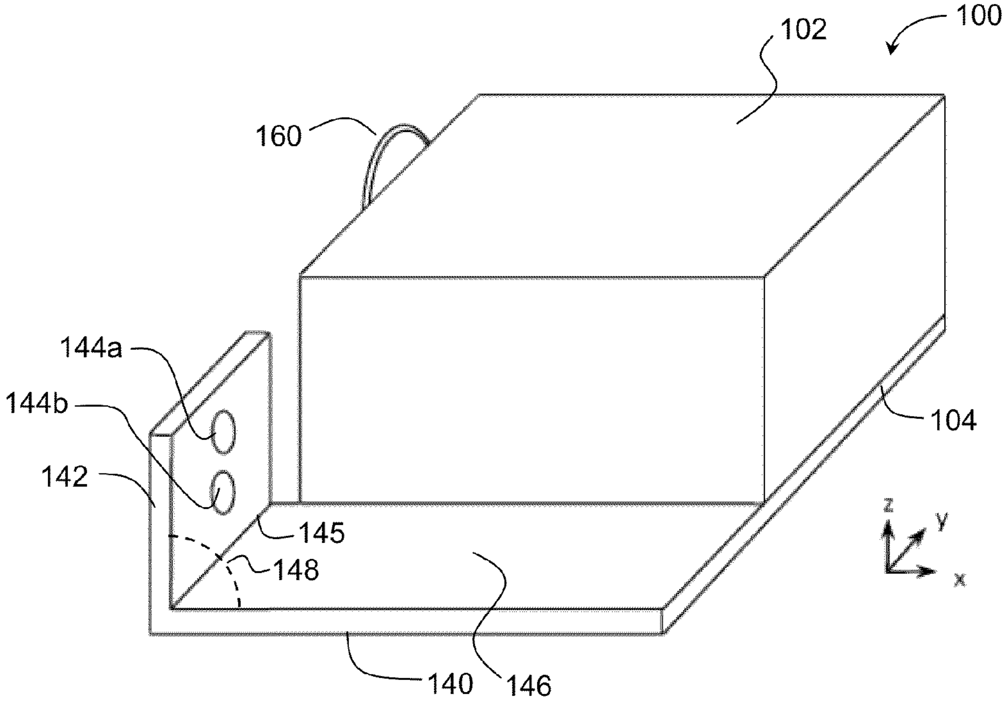
FIG. 1*b* illustrates a perspective view of an RF detector with an antenna for use in UV curing systems, from an opposite side to FIG. 1*a*, according to some embodiments.
Figure 2A:
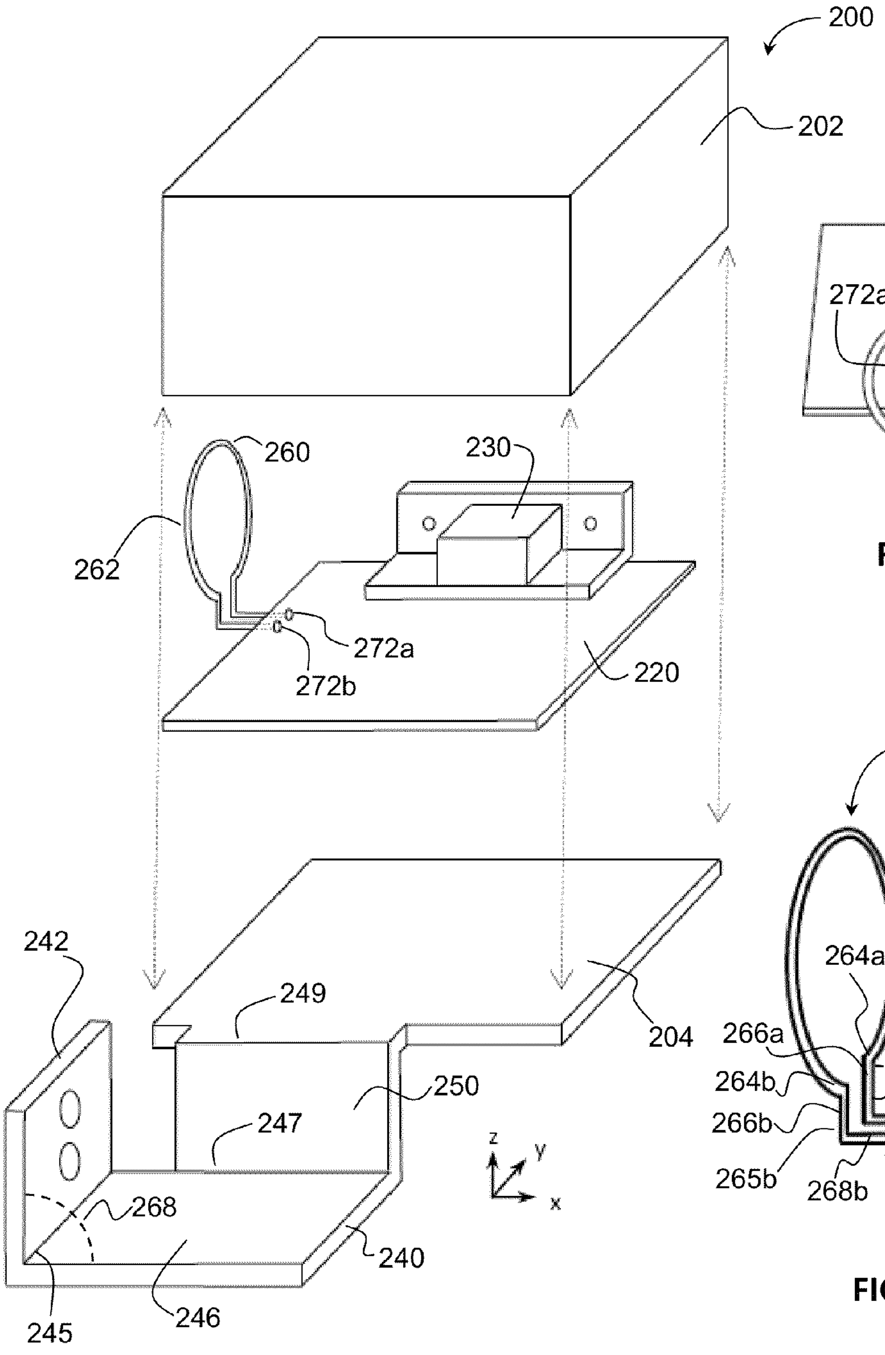
FIG. 2*a* illustrates a perspective view of components of an RF detector for use in UV curing systems, according to some embodiments.
Figure 2B:
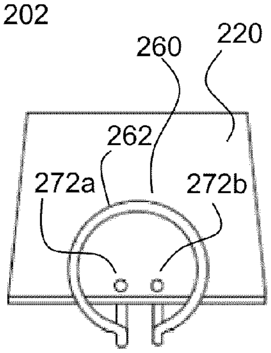
FIG. 2*b* illustrates a perspective view of an antenna and circuit board for use in an RF detector, according to some embodiments.

FIGS. 1*a* and 1*b* illustrate perspective views of an RF detector 100 with an antenna 160 for use in UV curing systems, according to some embodiments. FIG. 1*b* illustrates a perspective view of the opposite side of the RF detector 100 that is illustrated in FIG. 1*a*. FIG. 2*a* illustrates a perspective view of components of an RF detector 200, according to another embodiment, showing an antenna 260 coupled to a circuit board 220 having a power supply box 230. FIG. 2*b* shows another perspective view of the antenna 260 coupled to the circuit board 220.

The RF detectors illustrated in FIGS. 1*a*, 1*b* and 2*a* are designed for use in UV curing systems, such as discussed in reference to FIGS. 4-7, herein. The RF detectors may be used to detect or monitor for low-level RF and/or microwave radiation escaping from cavities in UV lampheads, which may negatively impact semiconductor devices being processed. For example, the detection of low-level microwaves can signify that damage has occurred to the screen that aids in containing the microwave in the resonant cavity of the lamphead. By detecting such problems before or even during a production run, embodiments discussed herein provide higher yields and less waste.

The antenna 160, shown in FIGS. 1*a*-1*b*, provides for directional focus of the RF detector 100. The antenna 160 may be a dipole antenna and may be unshielded. The antenna 160 may also have a hoop-shaped portion coupled to first and second legs that are coupled to a circuit board (e.g., circuit board 220 in FIGS. 2*a* and 2*b*). The hoop-shaped portion may be circular. The antenna 160 may be shaped from a single wire or other piece of metal, and may be bent or otherwise shaped to provide the desired configuration and directional focus.

In the embodiment shown, the RF detector has a housing cover 102, a base plate 104 and a bracket 140. The housing cover 102 has an antenna opening 106, which allows the antenna 160 to be coupled or connected to internal components of the RF detector 100 inside the housing cover 102. The housing cover 102 also has a communications opening 108 for inputting and outputting signals and/or receiving power from an external source through a communications port 110. The communications port 110 may provide pin connections (not shown), such as a standard nine pin connection port in which five pins are aligned on a top row, with four pins aligned on a bottom row. The communications port 110 may be attached to face plate 112 and be held in position by bolts 114*a* and 114*b*, which may connect to the power supply unit (not shown) inside the housing cover 102. Bolts 114*a* and 114*b* may be threaded screws. The communications port 110 may also connect to a power supply unit (e.g., power supply unit 230 in FIG. 2*a*) for the RF detector 100.

The bracket 140 is adapted to mount the RF detector 100 within the UV curing system (or substrate processing system). For example, damage to the screen can occur in various locations. This affects the detection level sensed by the RF detector 100. Testing has shown that the level of leak detected is determined by the proximity of the RF detector 100 (or sensor) to a tear or a hole in the screen. Mounting the detector in a stationary position and rotating an energized lamphead helps ensure that any RF or microwave leak is detected. Alternatively, on a stationary lamphead, the detector may be rotated around the lamphead. In another embodiment, more than one RF detector may be used. For example, multiple RF detectors may be mounted at various positions around a periphery of a lamphead, or a periphery of a housing or around a circumference of a tray on which the lamphead is positioned. Mounting positions may also be selected based on available space within a UV curing system or substrate processing system.

Embodiments discussed herein have proven useful for determining other equipment issues besides screen tears. For example, using RF detectors as discussed herein may also determine if a UV bulb is not positioned properly or has fallen from its mounting. Applications may also allow for determining if there is improper torque on the screen which is resulting in leaking, or for example, a loose screen. Further, embodiments discussed herein allow for identifying defects in the resonant cavity for the lamphead, loose magnetrons, broken bulbs, missing spot welds or other improperly assembled equipment.

In the embodiment shown in FIGS. 1*a*-1*b*, the bracket 140 is coupled to the base plate 104. The base plate 104 and the bracket 140 may be made or shaped from a single piece of material, such as a metal plate or sheet. Accordingly, the bracket 140 may be an extension of the base plate 104, for ease of manufacture. The bracket 140 may have a mounting adaptor 142 for mounting the bracket to an objection within the UV curing system or substrate processing system. In the embodiment shown, the mounting adaptor 142 has holes 144*a* and 144*b*, which may be adapted to receive screws, bolts or pins. In embodiments where the RF detector 100 is stationary and the lamphead rotates, receptor holes (not shown) may be provided on a stationary object, such as lower housing 626 illustrated in FIG. 6. Alternatively, the RF detector 100 may be mounted to a rotating component. In FIGS. 1*a*-1*b*, the mounting adaptor 142 is a plate, which may be shaped from bending the metal bracket 140 at a joint 145. Further, the mounting adaptor or plate 142 may be positioned to the side of the housing cover 102 to provide access to the holes 144*a* and 144*b*, by coupling the mounting adaptor 142 to a bracket body 146, which is positioned adjacent to a side of the base plate 104. Accordingly, holes 144*a* and 144*b* may be positioned a distance from the housing cover 102 in a horizontal direction (along the y-axis of FIG. 1*b*). As stated above, these components may be made from a single piece of material or metal. Thus, the bracket body 146 may have the same length (illustrates along the x-axis of FIG. 1*a*-1*b*) as the base plate 104. In other embodiments, the bracket body 146 may have a shorter length than the base plate 104.

In order to position the antenna 160 in a desired alignment, the mounting adaptor 142 and the bracket body 146 may be positioned at a mounting angle 148. In some embodiments, mounting angle 148 may be a right angle of about 90°. In other embodiments, the mounting angle 148 may be greater than or less than 90°. For certain embodiments, the antenna 160 is positioned at the same or similar angle to the base plate 104 or some other component of the RF detector, and the mounting angle 148 is positioned at about the same angle as the antenna 160. For example, if the antenna 160 is positioned at an angle greater than 90°, the mounting angle 148 may be positioned at the same angle so that the antenna 160 is vertical. In other embodiments, the antenna is positioned parallel to components of the UV curing system, such as the lower housing 626 illustrated in FIG. 6.

Figure 2C:
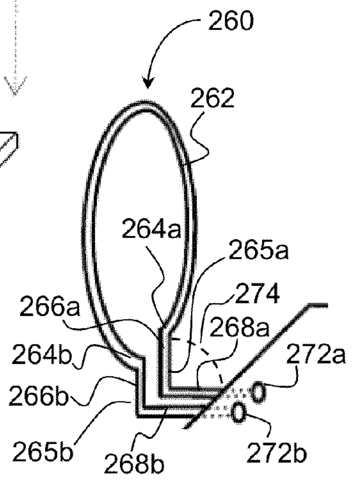
FIG. 2*c* illustrates a closer view of the antenna shown in FIG. 2*a*.

FIG. 2*a* shows another embodiment of an RF detector 200, and also provides a simplified view of the internal components. FIG. 2 is similar to FIGS. 1*a*-1*b*, with a different bracket 240 arrangement. In FIG. 2, the bracket 240 has an extension piece 250, which may be used to set, change or adjust an elevation of an antenna 260 relative to components of the UV curing system or substrate processing system. Alternatively, the bracket extension piece 250 may be used to position a base plate 204 a distance from a bracket body 246, or another component. In FIG. 2*a*, the base plate 204 and the bracket body 246 are spaced apart by a distance along the z-axis. Other arrangements are contemplated as well. Further, FIG. 2 illustrates a bracket 240 configuration in which the bracket body 246 and the extension piece 250 have a shorter length (along the x axis) than the base plate 204. Moreover, the base plate 204 and the components of the bracket 240 may be made from a single plate, sheet or piece of material (such as a metal), which is bent along a mounting adaptor joint 245 (joining a mounting adaptor 242 to the bracket body 246), a bracket body joint 247 (joining the bracket body 246 to the bracket extension piece 250) and a bracket extension joint 249 (joining the bracket extension piece 250 to the base plate 204.

FIGS. 2*a* and 2*b* illustrate the antenna 260 coupled to a circuit board 220 by anchor connections 272*a* and 272*b*. FIG. 2*a* also illustrates a power supply box 230 coupled to the circuit board 220, which may be coupled to a communications port (such as communications port 110 shown in FIG. 1*a*). As shown by the dotted arrows, the circuit board 220 and the power supply box 230 may be positioned over the base plate 204 and inside a housing cover 202.

Similar to FIGS. 1*a* and 1*b*, the antenna 260 may be a dipole antenna, may be unshielded and may be made from a single piece of wire or other metal that is bent or shaped to the desired configuration. As shown in FIG. 2*a*, the antenna 262 may have a hoop-shaped portion 262 (illustrated as circular in FIG. 2*b*). A closer-view is provided in FIG. 2*c*. The hoop-shaped portion 262 may curve around between a first end 264*a* and a second end 264*b*, which join to first and second legs 265*a* and 265*b*, respectively. In the embodiment shown, the first and second legs are each bent at an antenna angle 274. Accordingly, the first end 264*a* joins to a first upper-leg portion 266*a*, which joins to a first lower-leg portion 268*a* that extends underneath a lower side of the circuit board 220 to the first anchor connection 272*a*. Similarly, the second end 264*b* joins to a second upper-leg portion 266*b*, which joins to a second lower-leg portion 268*b* that extends underneath a lower side of the circuit board 220 to the second anchor connection 272*b*. Each upper-leg portion may be set at the antenna angle 274 to each lower-leg portion, respectively, to provide the antenna 260 with a desired position or direction of focus. As discussed above for FIGS. 1*a* and 1*b*, the mounting adaptor plate 242 may also be set at a mounting angle 268 to also provide the antenna 260 at a desired position or direction of focus. In some embodiments, the mounting angle 268 may be about the same as the antenna angle 274. In further embodiments, the antenna 260 may be positioned vertically (such as along the z-axis in FIG. 2*a*).

Figure 3A:
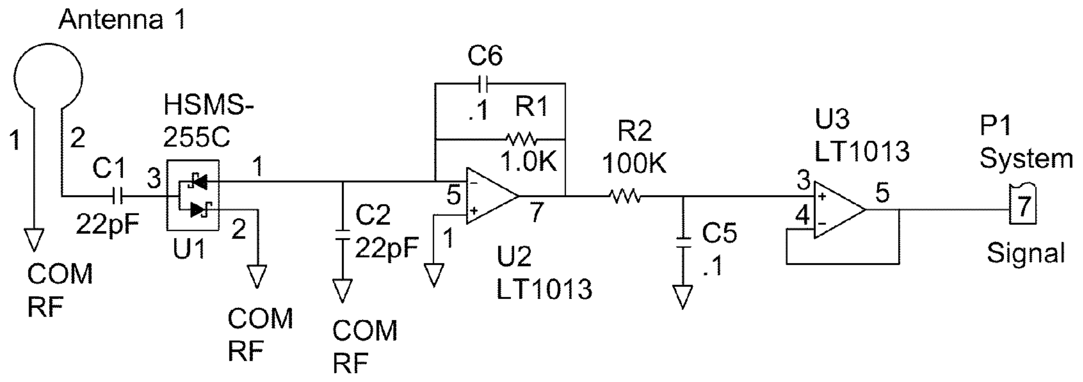
FIG. 3*a* illustrates a circuitry schematic of an RF detector for use in UV curing systems, according to some embodiments.
Figure 3B:
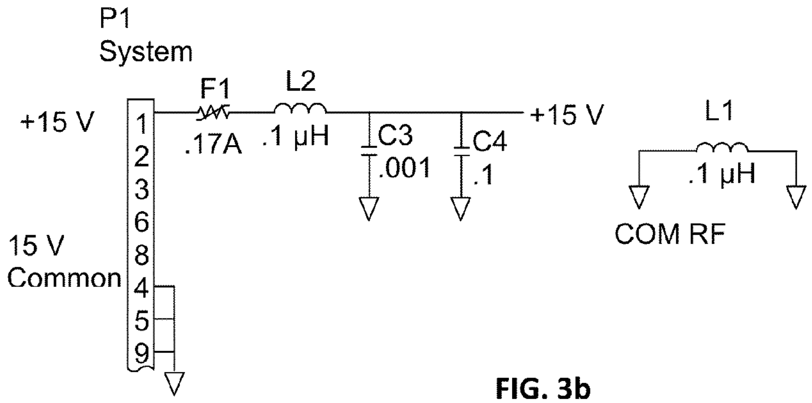
FIG. 3*b* illustrates a continuation of the circuitry schematic illustrated in FIG. 3*a* of an RF detector for use in UV curing systems, according to some embodiments.

FIGS. 3*a* and 3*b* show a schematic of a circuit 300 for an RF detector, according to some embodiments. FIG. 3*b* continues the circuit shown in FIG. 3*a*, beginning with the remainder of a power and signal system P1. The P1 system is shown according to the nine pin arrangement discussed above. The overall schematic provides an antenna 160 with a diode detector and an amplifier circuit. One end of antenna 160 is coupled to a common ground 312 for the RF detector, and the other end of antenna 160 is coupled to the remainder of the circuit 300. In one embodiment, six capacitor are provided in the circuitry C1-C6, having units of measurement of picoFarads (pF). In a further embodiment, C1 is 22 pF, C2 is 22 pF, C3 is 0.001 pF, C4 is 0.1 pF, C5 is 0.1 pF and C6 is 0.1 pF. Inductors L1 and L2 each have a value of 0.1 pH. Additionally, operational amplifiers (“op amps”) U1, U2 and U3 are provided in the circuit 300. Resistors R1 and R2 have values of 1.0 K Ohms and 100 K Ohms, respectively. A fuse F1 is coupled to the P1 system and provides about 0.17 A for +15V.

Figure 4:
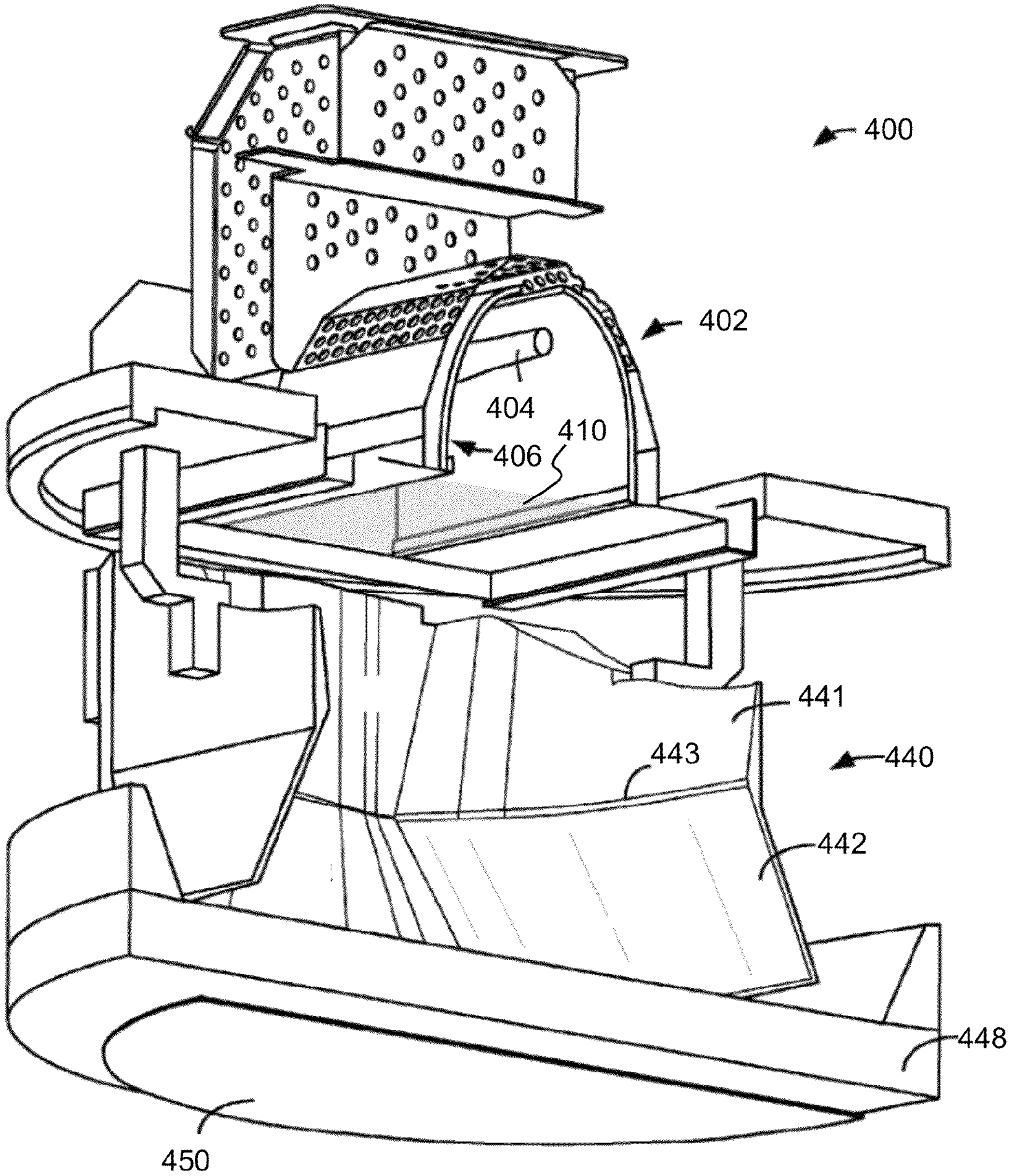
FIG. 4 illustrates a simplified, cross-section perspective view of a UV lamp module, according to some embodiments.

FIG. 4 illustrates a simplified, cross-section perspective view of a UV lamp module 400, which may be used in conjunction with an RF detector, according to some embodiments. The UV lamp module 400 has a UV lamp 402 with a UV bulb 404, which is partially surrounded by a primary reflector 406. The UV lamp 402 may be a high power mercury microwave lamp. For example, a high voltage power supply can provide voltage to magnetrons that generate microwaves to excite gases inside the UV bulb 404 to generate UV radiation used for curing or processing wafers. In practice, more than one UV bulb or UV lamp assembly may be used, such as the dual lamp system illustrated in FIG. 6. Microwave arc lamps may also be used, although other types of UV sources are contemplated, including pulsed xenon flash lamps or high-efficiency UV light emitting diode arrays. UV bulbs may be sealed plasma bulbs filled with one or more gases such as xenon or mercury for excitation by power sources, such as microwave generators. In some embodiments, microwave generators may comprise one or more magnetrons.

Beneath the UV bulb 404, the primary reflector 406 and the resonant cavity 408, a screen 410 is provided to allow UV radiation to pass through while blocking microwaves (or other RF). The screen 410 may be a fine mesh screen made from stainless steel. The screen 410 may be clamped between two pieces of metal (not shown) with RF gasketing to prevent microwave leakage. Damage to the screen 410 allows microwaves to pass through. Small holes or tears can allow low-level microwaves to reach a semiconductor substrate 450, positioned below the lamphead. Low-level microwaves that are not detectable by safety equipment can still damage semiconductor devices on the substrate 450. Accordingly, an embodiment of an RF detector, such as discussed above in reference to FIGS. 1*a*-3, may be positioned outside the periphery of the lamphead with its antenna positioned to directionally focus on and monitor microwave radiation in an area beneath the screen 410. (See also FIG. 6).

Furthermore, a secondary reflector 440 is positioned between UV lamp 402 and the semiconductor substrate 450. The UV lamp 402 may be positioned on a disc 412. The disc 412 may have teeth (e.g., discs 512*a* and 512*b* in FIG. 5), which facilitate rotating the UV lamp along with its primary and secondary reflectors 406 and 440, respectively. The lower edge of the secondary reflector has a diameter that is smaller than a diameter of the substrate so there is no optical gap between the secondary reflector and the outside diameter of the substrate as viewed from the direction of the lamp. A UV transparent window 448 (such as quartz) is positioned between the lamp 402 and a substrate 450, so that an upper surface of the substrate 450 is exposed to UV radiation. A small gap is positioned between the bottom of the secondary reflector and the UV transparent window 448 to allow for air flow around the secondary reflector. In one embodiment the distance between an upper surface of the substrate 450 that is exposed to UV radiation and the bottom of secondary reflector 440 (which includes the thickness of the window 448) is approximately 1.5 inches. The secondary reflector comprises an upper portion 441 and a lower portion 442, which meet at a vertex 443. The secondary reflector directs UV radiation, which would otherwise fall outside the boundary of the primary reflector’s flood pattern, to the upper surface of the substrate 450. The secondary reflector 440 can also alter the flood pattern of UV light from a substantially rectangular area to a substantially circular shape.

Figure 5:
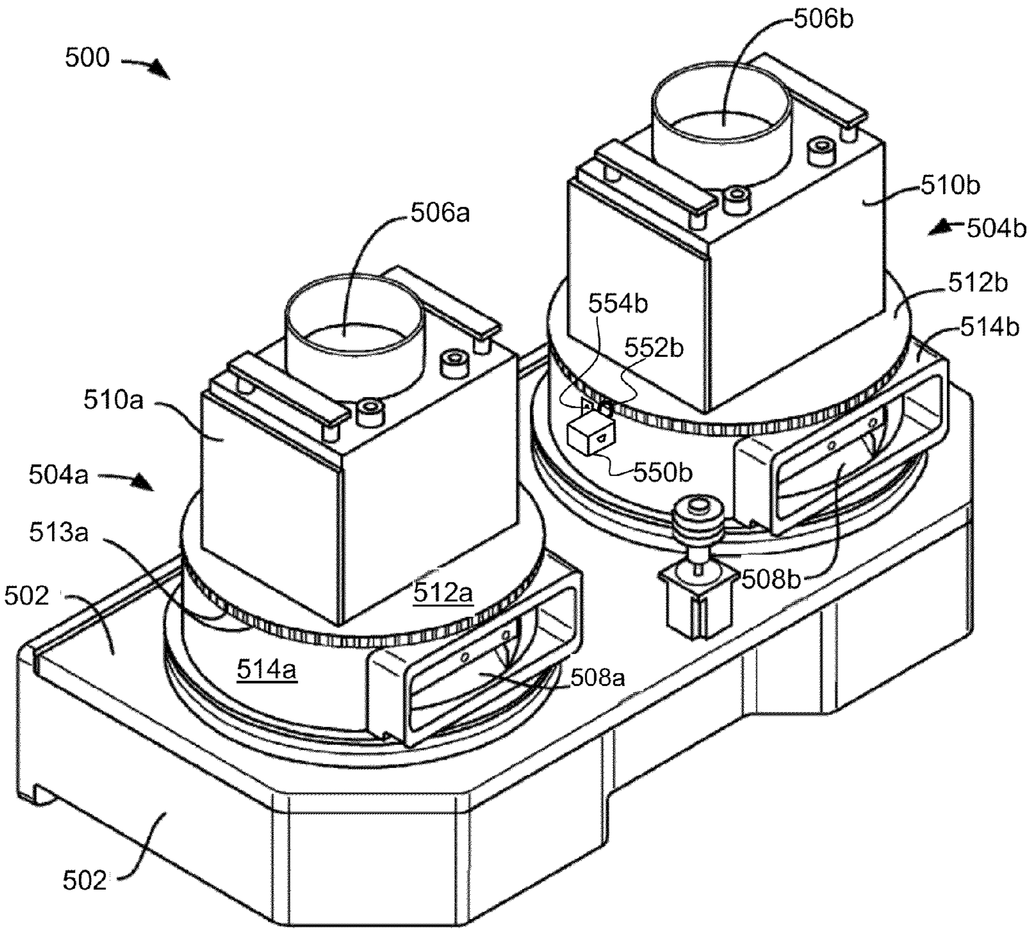
FIG. 5 illustrates a perspective view of a tandem processing chamber for UV curing, with an RF detector, according to some embodiments.

FIG. 5 illustrates a perspective view of an RF detector positioned on a tandem process chamber 500 for UV curing. An exemplary tandem process chamber is the PRODUCER™ chamber available from Applied Materials, Inc. of Santa Clara, Calif. Then tandem process chamber 500 comprises two UV cure chambers 504*a* and 504*b*, each adapted to process one or more substrates therein. Each of the UV cure chambers are generally separated by a wall (not shown). The tandem process chamber 500 includes a body 501 and a lid 502 that may be hinged to the body 501. Coupled to an upper surface of the lid is a first lower housing 514*a* and a second lower housing 514*b*. Each of the lower housings 514*a* and 514*b* are adapted to house a secondary reflector inside. Positioned above each of the lower housings 514*a* and 514*b* are upper housings 510*a* and 510*b*, respectively.

Each upper housing 510*a* and 510*b* has one or more lamps positioned therein to provide UV radiation through the lower housings 514*a* and 514*b* and into the body 501, in which one or more substrates may be positioned to receive the UV radiation. In some embodiments, each upper housing 510*a* and 510*b* is mounted on a disc 512*a* and 512*b*, respectively, having disc teeth, such as disc teeth 513*a* that grip a corresponding belt (not shown) that couples the disc to a spindle that is operatively coupled to a motor (not shown). The combination of discs, belts, spindle and motor allow each upper housing 510*a* and 510*b* (and the UV lamps mounted therein) to be rotated relative to the substrate positioned on a substrate support below lid 502. In additional embodiments, secondary reflectors may also rotate along with the discs inside the lower housings 514*a* and 514*b*, respectively, while the lower housings 514*a* and 514*b* remain stationary. Inlets 506*a* and 506*b* may be provided in the upper housings 510*a* and 510*b*, respectively, and outlets 508*a* and 508*b* may be provided in the lower housings 514*a* and 514*b*, respectively, which allow for cooling air to pass through the interiors of the upper and lower housings.

Additionally, one or more RF detectors may be positioned to monitor for low-level microwave excursions. In the embodiment shown in FIG. 5, a first RF detector 550*b* is mounted by a mounting adapter 554*b* of a bracket (not shown) to the stationary lower housing 514*b*. A second RF detector (not shown) would be mounted in a similar position on lower housing 514*a*. (See, e.g., FIG. 7). An unshielded dipole antenna has a hoop portion 552*b* positioned facing a lower portion of the disc 512*b* (or tray) and an upper portion of the lower housing 514*b*, which corresponds to an area radially outwards from an area below the resonance chambers and/or screen (not shown) (See also FIG. 6). Stated another way, an RF antenna may be positioned facing an interface between a lamp housing and a tray, or facing an area where the lamp housing couples to the lamp tray. The hoop portion 552*b* of the antenna may be spaced a distance from the outer circumference of the disc 512*b* (or tray) to avoid interference with any moving parts. In other embodiments, the hoop portion 552*b* of the antenna may be spaced a short distance from the outer surface of the lower housing 514*b*.

Figure 6:
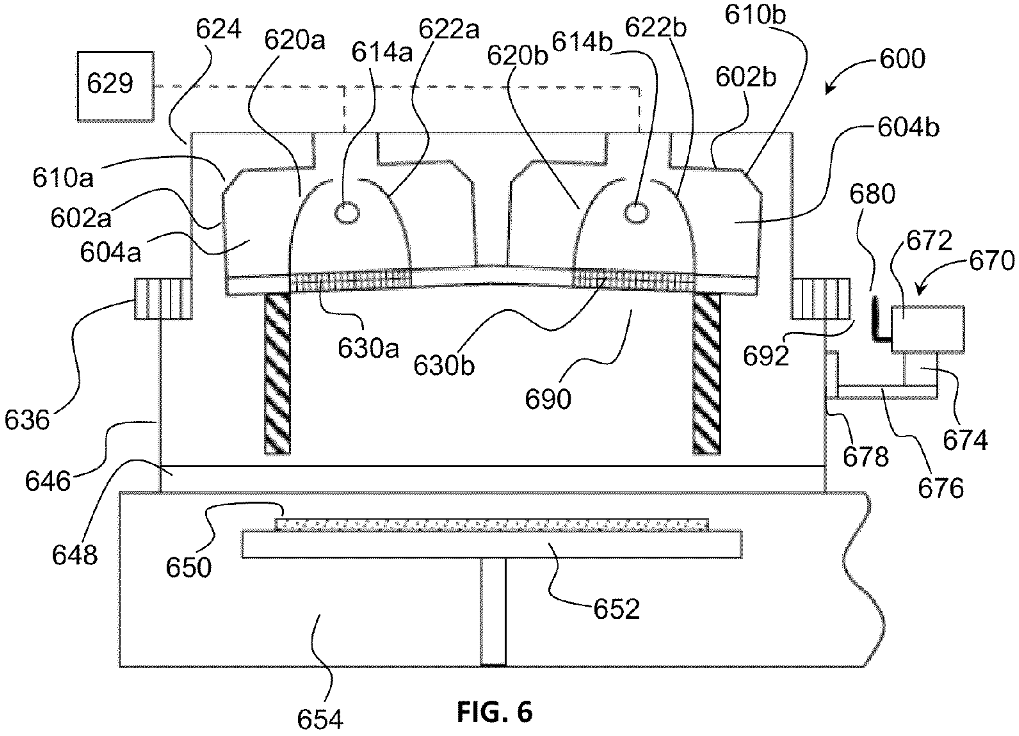
FIG. 6 illustrates a cross-section schematic of a dual lamp chamber for UV curing with an RF detector, according to some embodiments.

FIG. 6 provides a simplified cross-section schematic of a dual-lamp UV curing chamber 600 with an RF detector, which may be used in the tandem process chamber 500 discussed above for FIG. 5. The UV curing chamber 600 has a lamphead 601 having a first UV lamp 610*a* and a second UV lamp 610*b*, which are configured similarly. The first and second UV lamps 610*a* and 610*b* are positioned inside an upper housing 624. The first lamp 610*a* has a resonant chamber 602*a* at least partially surrounding a resonant cavity 604*a* in which is positioned a UV bulb 614*a*. An outer primary reflector 620*a* and an inner primary reflector 622*a* are positioned above and around the UV bulb, and are adapted to direct UV radiation from the UV bulb 614*a* through a mesh screen 630*a*. In some embodiments, the lamphead 601 may have magnetrons (not shown) that generate microwaves to excite a gas inside the UV bulb 614*a*, which produces UV radiation. (Other configurations are contemplated as well, such as discussed above.) The screen 630*a* is adapted to allow for UV radiation to pass through, while blocking microwaves. The second UV lamp 610*b* is configured similarly to the first, and has a resonant chamber 602*b*, a resonant cavity 604*b*, a UV bulb 614*b*, an outer primary reflector 620*b*, an inner primary reflector 622*b* and a mesh screen 630*b*. The output or intensity of the UV bulbs 614*a* and 614*b* may be controlled by a controller 629. Alternatively, a plurality of controllers may be used.

The upper housing 624 of the lamphead 601 may be mounted on a disc 636 (or other tray), and coupled to a secondary reflector 640. The disc 636 may have teeth for gripping, such that the disc may be rotated along with the lamphead and reflector assembly. The secondary reflector 640 may be positioned within a lower housing 646, which is positioned at least partially below the disc 636. In some embodiments, the lower housing 646 is stationary, and thus is not rotated along with the disc, lamphead and reflectors.

A quartz window 648 is positioned between the lamphead 601 and a substrate support 652 inside a processing chamber 654. The processing chamber 654 is illustrated as cutoff on its right side, to indicate that it may be part of a tandem processing chamber. During processing, a substrate 650 may be positioned on the substrate support 652. The lower edge of the secondary reflector 646 has an inner diameter that is smaller than a diameter of the substrate 650 so there is no optical gap between the secondary reflector 646 and the outside diameter of the substrate 650 as viewed from the direction of the lamphead 601. The secondary reflector 646 has a channeling effect, reflecting UV radiation that would otherwise fall outside the boundary of the primary reflectors' flood pattern such that such radiation impinges upon the substrate 650 being cured. The secondary reflector 646 can also alter the flood pattern of UV radiation from a substantially rectangular area to the substantially circular shape of a wafer substrate. Additionally, a small gap may be positioned between the bottom of the secondary reflector 646 and the quartz window 648, to allow for the flow of a cooling gas such as air.

An RF detector 670 is shown positioned adjacent to an external side of the lower housing 646. The RF detector 670 has a housing 672 inside which a circuit board may be positioned that is coupled to an antenna 680. In the embodiment illustrated in FIG. 6, a bracket is shown comprising a bracket body 676, an extension piece 674 and a mounting adaptor 678, as discussed above in reference to FIGS. 1*a*, 1*b* and 2*a*. The mounting adaptor attaches or couples to the lower housing 646. The bracket body may position the antenna 680 at an appropriate or desired distance from the lower housing 646 and/or the disc 636. This distance is illustrated as horizontal, but may be in other directions as well. In some embodiments, the extension piece 674 may also be used to adjust or set the elevation of the antenna 680 with respect to one or more components of the UV curing system, such as the lamphead, resonant chambers, screens, disc, or upper or lower housings. An RF antenna may be positioned facing an interface between a lamp housing and a tray, or facing an area where the lamp housing couples to the lamp tray. In another embodiment, the antenna 680 is positioned facing or directed towards an area 690 directly under the screens 630*a* and/or 630*b*, or stated another way, the area 690 is on an opposite side of the screen as the UV bulb, as illustrated by the area 690. This arrangement allows for detecting microwave excursions from outside the housing of the UV curing system (or chamber) that may affect semiconductor devices inside the processing chamber 654. Thus, in some embodiments, the antenna 680 may be positioned external to the upper and lower housing and adjacent to an external area 692 that is on the same horizontal plane as an area directly underneath one or more screens 630*a* or 630*b*.

In some embodiments, more than one RF detector 670 may be used. For example, the RF detector 670 in FIG. 6 is more sensitive to tears in screen 630*b* than to tears in screen 630*a* because of the difference in distances. For embodiments where the lamphead 601 or its components are not rotated, a second RF detector (not shown) could be positioned at a location where its antenna may be at a closer distance to an area underneath screen 630*a*. In further embodiments using more than one RF detector, the plurality of RF detectors may be positioned at approximately equal distances from the respective screens they are monitoring.

Figure 7:
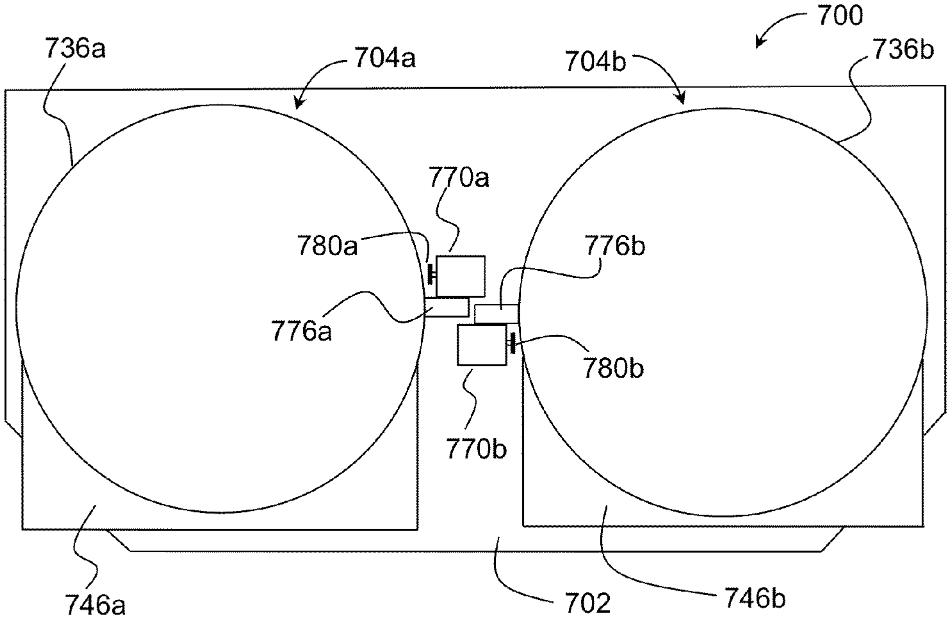
FIG. 7 illustrates a simplified, top-view schematic of a tandem processing chamber for UV curing, with an RF detector, according to some embodiments.

FIG. 7 illustrates a simplified, top-view schematic of RF detectors positioned on a tandem processing chamber 700 for UV curing, according to some embodiments. (The lampheads are not shown.) In FIG. 7, a first disc 736*a* of a first UV curing chamber 704*a* is positioned over a first lower housing 746*a*, and a second disc 736*b* of a second UV curing chamber 704*b* is positioned over a second lower housing 746*b*. The lower housings 746*a* and 746*b* are positioned over the lid 702 of the tandem processing chamber. Each disc 704*a* and 704*b* overlaps the respective lower housing 746*a* and 746*b*. First and second RF detectors 780*a* and 780*b* are positioned facing each of the first and second UV curing chambers 704*a* and 704*b*, respectively. In FIG. 7, each RF detector 770*a* and 770*b* has an antenna 780*a* and 780*b*, respectively, and a bracket 776*a* and 776*b*, respectively. The brackets 776*a* and 776*b* may be attached or coupled to the respective lower housings 746*a* and 746*b* at locations beneath the discs 736*a* and 736*b*, respectively. As shown, antenna 780*a* is positioned outside a diameter of disc or tray 736*a*, and antenna 780*b* is positioned outside a diameter of disc or tray 736*b*.

Although the RF detectors 770*a* and 770*b* may be aligned with the centers of the UV curing chambers 704*a* and 704*b*, this alignment is not required. In some embodiments, the brackets 776*a* and 776*b* may each be aligned with a midpoint or center of each of the first and second UV curing chambers 704*a* and 704*b*, and each of the RF detectors 770*a* and 770*b* with their respective antennas 780*a* and 780*b* may be offset from the centers. Alternatively, each of the offset RF detectors 770*a* and 770*b* and/or their respective antennas 780*a* and 780*b* may be positioned (or mounted in a turned position or at an angle) to face a center of each UV curing chamber 704*a* and 704*b*, respectively.

Turning back to FIG. 6, it should be appreciated that damage to the screens 630*a* and 630*b* can occur in various locations. The location of screen damage affects the detection level sensed by embodiments of RF detectors provided herein, because of the distance from one or more RF detectors to the tear. Moreover, the increased measurement capacity and sensitivity of the RF detectors to low-level microwaves also make detection possible of microwaves that do not negatively affect the substrates, such as very small equipment irregularities that do not impact device processing or even background noise. However, even if a threshold detection limit is chosen, there remains the issue of that limit changing based on the position of a tear. Therefore, questions arise as to how best to determine if a problem exists from the measurements that are taken.

More than one approach is contemplated herein to address the issue of how to determine if a problem exists from RF measurements. As discussed above, in some embodiments, a rotational measurement may be provided. In some embodiments, the lamphead assembly may be rotated with a stationary RF detector, and a monitoring system may monitor for a peak reading during the rotation. A warning alert may then be set for a threshold measurement value, which if triggered, may send an alert to a screen for an operator. A threshold alarm limit may be based on variables related to microwave excursions, such as voltage signals from the RF detector or microwave readings in units of measurement such as $mW/cm^2$. Antenna size may be selected based on a desired range of measurement values and/or based on equipment size within the UV curing system. Thresholds may be set or adjusted based on common or anticipated problems. Thresholds may also be set or adjusted based on correlations between measurement readings and effects on substrates. In other embodiments, an RF detector may be rotated around the periphery of a tray or housing at an elevation appropriate to detect microwave excursions. In alternative embodiments, more than one RF detector may be positioned around the periphery of a tray or housing at an elevation appropriate to detect microwave excursions, and the monitoring system may monitor for peak readings from the plurality of RF detectors.

To determine an appropriate threshold alarm limit, a set of experiments were conducted using RF detectors according to embodiments discussed herein. Six screen with various size holes were used to determine how large of a tear in the screen would affect the uniformity on the wafer for a given process. A two tiered approach was used to determine if the design would satisfy the functionality requirements of a process operation. A first series of tests were carried out to verify the viability of the design by characterizing the detector sensitivity to various hole sizes. A second series of tests were used to determine what the level of microwave leakage would be for wafer scrap, and ensure that the detector was sensitive enough to meet this threshold.

The hole sizes in the screen started at 0.25"×0.25" and increased to 1.25"×0.5" in 0.25" increments. Low-k silicon wafers were evaluated for the effects from microwaves excursions, with respect to shrinkage %, shrinkage N/U (1 s, %) and RI. Shrinkage N/U is shrinkage non-uniformity, and RI is refractive index. Results are shown in Table 1, below. Baseline measurements were taken using a known good screen using an RF detector and verified with a HI-1501 Holaday Microwave Survey Meter. Baseline voltage for the detector was 17-29 mv and 0.2 $mW/cm^2$ from the survey meter with 80% microwave power. Leakage from the tears in the screen were not detected until the hole size reached 0.75"×0.5." This showed a peak voltage of 53 mv from the sensor and 0.3 $mW/cm^2$ from the survey meter. The film properties were not affected until the leak was much larger (1.25"×0.5"), demonstrating successful performance. Since the lampheads rotate during the curing process the amplitude of the leak changes based on proximity of the damage area of the screen and the RF sensor. With this in mind it was deemed that the peak output of the sensor would be used as a trigger to signal an event for real time monitoring of a curing process to help avoid wafer scrap.

TABLE 1

| | Screen hole size (inches) | | | |
|---|---|---|---|---|
| | Baseline | 0.75 × 0.5 | 1.0 × 0.5 | 1.25 × 0.5 |
| Sensor output (max, V) | 0.029 | 0.053 | 0.131 | 2.168 |
| Holaday survey meter $mW/cm^2$) | 0.2 | 0.3 | 0.4 | 4 |
| Shrinkage (%) | 16.40% | 16.20% | 16.50% | 19.50% |
| Shrinkage N/U (1s, %) | 2.30% | 2.30% | 2.00% | 6.50% |
| RI | 1.3565 | 1.3567 | 1.356 | 1.3976 |

Based on the results in Table 1, it was determined that a hole of 1.0×0.5 inches will not have a detrimental effect on the wafers. The threshold for the alarm to trigger was temporarily set at 80 mV to ensure that the system warning is triggered at a level safe for the wafer and high enough not to cause nuisance alarms. Alternatively, an alarm threshold may be set that is a value less than about 130 mV, between about 80 mV and 130 mV, or between about 30 mV and 130 mV. Alarm thresholds may also be correlated to or expressed as microwaves readings, such as in $W/cm^2$ or $mW/cm^2$. It is contemplated that different results and different alarm limits may be appropriate for various applications.

Figure 8:
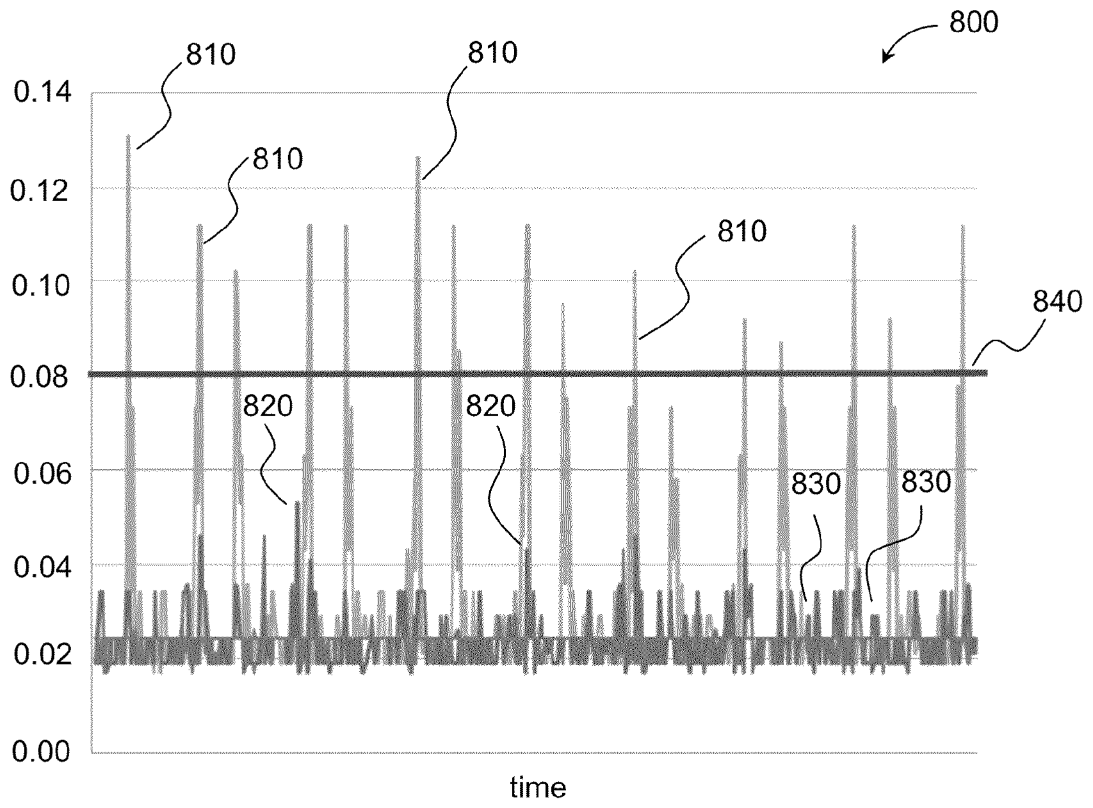
FIG. 8 illustrates a chart of microwave measurements as voltage readings over time with a threshold alarm level, according to some embodiments.

FIG. 8 illustrates a chart 800 of microwave measurements as voltage readings over time with a threshold alarm level, comparing readings from the different screen holes of Table 1. The x-axis represents time. The y-axis represents RF detector measurements in Volts. As the lamphead rotates, peak readings are generated for various hole sizes as the holes pass in proximity to the RF detector. Peaks 810 represent the hole size of 1.0×0.5 inches. Peaks 820 represent the hole size of 0.75×0.5 inches. Peaks 830 represent the baseline measurement, with no holes, and may be considered background noise. As stated above, a threshold alarm limit 840 is set at 80 mV (0.08 volts), to provide a threshold level safe for the wafer and high enough not to cause nuisance alarms.

Accordingly, in some embodiments, the RF detector is adapted to monitor low-level microwave excursions in a range that comprises microwaves of at least about 5 mW/cm$^2$ or less. In other embodiments, the RF detector may be adapted to monitor microwave excursions in a range that comprises values of at least about 0.2-5 mW/cm$^2$. In other embodiments, the excursion range may comprise other values within this range. For example, the excursion range may comprise values in mW/cm$^2$ from about 0.3-5, 0.4-5, 1-5, 2-5, 0.2-4, 0.3-4, 1-4, 2-4, 0.3-3, or other combinations. Threshold alarm limits may be set, depending on the application at a selected value within any of these ranges. It should be appreciated that, to prevent damage to a substrate, the monitored excursion range may include one or more value ranges, including but not limited to: values that are below a level where damage can occur to a substrate, values approaching a threshold limit where it is desired to check equipment, and values approaching and/or exceeding a threshold level where damage is likely to occur to a substrate.

Furthermore, in some embodiments, the RF detector may output values in voltages, such as in volts or millivolts. Monitored voltage values and/or threshold voltage values may be correlated, related to or based on values that prevent damage to a substrate, as discussed above for the microwave ranges. For example, as illustrated in FIG. 8, the voltage values generated from an RF detector may be monitored in a range from about 29 mV to about 130 mV, and a threshold alarm limit may be set at a value within this range, such as 80 mV. Other ranges may be used as well. Voltage values may be correlated to RF readings that prevent damage to a substrate, or to microwave values. Look up tables and mathematical formulas may also be used to determine appropriate monitoring levels, alarm limits or threshold values.

While the foregoing is directed to embodiments of the present invention, other and further embodiments of the invention may be devised without departing from the basic scope thereof, and the scope thereof is determined by the claims that follow.

The invention claimed is:

1. A substrate processing system comprising:

a chamber body;

a substrate support positioned within the chamber body;

an ultraviolet radiation lamphead assembly fixed to the chamber body and spaced apart from the substrate support, the lamphead assembly having an ultraviolet bulb positioned in a resonant cavity, one or more microwave generators, and a screen positioned between the ultraviolet bulb and the substrate support; and an RF detector comprising an antenna and a circuit having a diode detector and an amplifier, wherein the RF detector is positioned to monitor low-level microwave excursions in a range that prevents damage to a substrate, wherein the antenna is unshielded and has two leg portions coupled to a hoop-shaped portion, the RF detector further comprises a circuit board within an RF housing, and the two leg portions of the antenna are coupled to the circuit board within the RF housing, wherein the RF housing has an antenna opening, and the two leg portions of the antenna extend a distance from the circuit board through the antenna opening to the hoop shaped portion of the antenna.

2. The substrate processing system of claim 1, wherein the low-level microwave excursions comprise values between about 5 mW/cm$^2$ to about 0.2 mW/cm$^2$.

3. The substrate processing system of claim 1, wherein the ultraviolet radiation lamphead further comprises:

a primary reflector assembly positioned to reflect ultraviolet radiation towards the substrate support;

a secondary reflector assembly positioned in an area below the screen and above the substrate support;

an upper housing having an interior space for housing the ultraviolet resonant cavity; and a lower housing having an interior space for housing the secondary reflector and an exterior surface, wherein the RF detector is coupled to an exterior surface of the lower housing.

4. The substrate processing system of claim 1, further comprising a monitoring system coupled to the RF detector, wherein the monitoring system adapted to monitor an input parameter from the RF detector related to microwave detection and generates an alert signal if an alert-threshold is met or exceeded.

5. The substrate processing system of claim 4, wherein the alert-threshold is set or adjusted to monitor peak measurements in real time as the ultraviolet radiation lamphead assembly rotates.

6. The substrate processing system of claim 1, further comprising a rotation disc having an external diameter, wherein the antenna of the RF detector is positioned a radial distance from the external diameter of the rotation disc, and the hoop-shaped portion of the antenna is in a vertical alignment.

7. The substrate processing system of claim 1, wherein the RF housing comprises a bracket having a mounting adaptor suitable for coupling to the lower housing of the lamphead.

8. The substrate processing system of claim 7, wherein the bracket has an extension section suitable for positioning the RF detector at a desired elevation.

9. A radio frequency (RF) detector comprising:

an antenna having a hoop-shaped portion;

a circuit board having a diode detector, an amplifier circuit and a power supply, wherein the antenna is coupled to the circuit board;

a circuit board housing having an interior space for housing the circuit board, wherein the hoop-shaped portion of the antenna is positioned outside the housing; and a bracket coupled to the housing and suitable for coupling the RF detector to a UV curing system, wherein the RF detector is adapted to monitor low-level microwave excursions in a range that prevents damage to a substrate.

10. The RF detector of claim 9, further comprising a monitoring system having a threshold alert limit, wherein the RF detector outputs a voltage value, and the low-level microwave excursions comprise values between about 5 mW/cm$^2$ to about 0.2 mW/cm$^2$.

11. The RF detector of claim 10, wherein the circuit board housing further comprises a base plate coupled to the bracket, and the base plate and the bracket comprise a single piece of metal.

12. The RF detector of claim 9, wherein the hoop-shaped portion of the antenna is positioned vertically, and the bracket comprises a mounting piece positioned at an angle with respect to a bracket body.

13. The RF detector of claim 12, wherein the bracket has an extension section coupled to the bracket body and suitable for positioning the RF detector at a desired elevation.

14. A method for detecting low-level microwave excursions in a UV curing system, the method comprising:

exposing one or more ultraviolet (UV) bulbs to microwaves to generate UV radiation from a UV lamp assembly having one or more resonance chambers;

monitoring a value related to microwaves excursions in a region external to the one or more resonance chambers; using a radio frequency (RF) detector comprising:

an antenna having a hoop-shaped portion;

a circuit board having a diode detector, an amplifier circuit and a power supply, wherein the antenna is coupled to the circuit board;

a circuit board housing having an interior space for housing the circuit board, wherein the hoop-shaped portion of the antenna is positioned outside the housing; and a bracket coupled to the housing and suitable for coupling the RF detector to a UV curing system, wherein the RF detector is adapted to monitor low-level microwave excursions in a range that prevents damage to a substrate; and generating an alarm when the monitored value meets or exceeds a threshold value.

15. The method of claim 14, further comprising rotating the UV lamp assembly.

16. The method of claim 15, wherein the threshold value is set or adjusted to be less than an amount at which the value correlates to microwave excursions that harm a substrate.

17. The method of claim 16, further comprising checking for equipment damage, wherein the threshold value is a voltage.

* * * * *